(12) United States Patent
Leighton et al.

(10) Patent No.: US 6,512,646 B1
(45) Date of Patent: Jan. 28, 2003

(54) IMPEDANCE-MATCHED WRITE CIRCUIT

(75) Inventors: John D. Leighton, Anoka, MN (US); Raymond E. Barnett, Rosemount, MN (US); Tuan V. Ngo, Eden Prairie, MN (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/475,909

(22) Filed: Dec. 30, 1999

Related U.S. Application Data

(60) Provisional application No. 60/160,486, filed on Oct. 20, 1999.

(51) Int. Cl.$^7$ ................................................. H03B 1/00
(52) U.S. Cl. ............................. 360/46; 360/68; 327/110
(58) Field of Search ............................. 360/46, 67, 68; 327/110, 108, 109

(56) References Cited

U.S. PATENT DOCUMENTS

| | | | |
|---|---|---|---|
| 5,869,988 A | 2/1999 | Jusuf et al. | ................. 327/110 |
| 6,121,800 A | * 9/2000 | Leighton et al. | ............ 327/110 |

FOREIGN PATENT DOCUMENTS

| | | |
|---|---|---|
| WO | WO 98/10420 | 3/1998 |
| WO | WO 99/60562 | 11/1999 |

* cited by examiner

Primary Examiner—David Hudspeth
Assistant Examiner—Varsha A. Kapadia
(74) Attorney, Agent, or Firm—Kinney & Lange, P.A.

(57) ABSTRACT

A write circuit selectively provides a write current through a write head in first and second opposite directions. The write circuit is connected to the write head by an interconnect, and has a positive supply level and a negative supply level. A first voltage source provides a first control voltage, and a second voltage source provides a second control voltage. A first resistor is provided between the first voltage source and the interconnect for impedance matching to the interconnect, and a second resistor is provided between the second voltage source and the interconnect for impedance matching to the interconnect. The first and second control voltages provide a transient voltage to the interconnect and provide a subsequent steady-state voltage to the interconnect.

6 Claims, 9 Drawing Sheets

IMPEDANCE-MATCHED WRITE CIRCUIT

CROSS-REFERENCE TO RELATED APPLICATION(S)

This application claims benefit from Provisional Application No. 60/160,486 filed Oct. 20, 1999 for "Impedance-Matched Writer" by John. D. Leighton, Ray Barnett and Tuan V. Ngo.

BACKGROUND OF THE INVENTION

This invention relates to drivers for write heads of magnetic disk drives, and particularly to write drivers having impedance matching characteristics.

Rigid magnetic disk drives employ E-block assemblies supporting a plurality of actuator arms each having a read head and a write head at the distal end thereof and arranged to move with the E-block across the radius of the magnetic recording disk. The writer circuit, or write driver, is included in an integrated circuit chip mounted on the E-block at the proximal end of the actuator arms and is connected to the write heads at the distal end through interconnect cable. Typically, the interconnect exhibits 100 Ohms differential impedance (Zdiff), 30 Ohms common-mode impedance (Zcm) and 250 picoseconds propagation delay time ($\tau$). The write head typically exhibits 25 nano-Henries of inductance (L) in parallel with 200 Ohms parallel resistance ($R_P$) with a series resistance of 10 Ohms ($R_S$) in series with the parallel L-$R_P$ circuit.

A typical write circuit generates a square wave current pattern through the write head, with each current pulse being composed of a rise-time portion, an overshoot portion, and a steady-state portion. The overshoot portion represents the portion of the pulse where the absolute value of the current exceeds the absolute value of the steady-state current; for example, where the steady state current is 40 mA, the overshoot current may reach a peak of 70 mA. The rise-time is defined as the time that it takes the current to change from 10% to 90% of its steady-state current, as it swings from one direction to the other. Thus, for a writer programmed for 40 mA steady-state write current, the rise time is defined as the time required for the current in the write head to change from −32 MA to +32 mA, and vice versa.

There have been many improvements to conventional write circuits to enhance their performance. However, these improved current-switching write circuits still are unable to achieve impedance matching to the interconnect, since such impedance matching would require a small resistor in parallel with the write head which would shunt the write current away from the write head during operation of the circuit and thereby render the circuit inoperable. The lack of impedance matching results in pattern dependent distortion which limits the performance of the write circuit. It would therefore be beneficial to the state of the art to provide a write circuit that operates on a principle that is somewhat different than that of conventional write circuits, so that the circuit can be impedance matched to the interconnect and thereby reduce or eliminate pattern dependent distortion while providing excellent performance.

BRIEF SUMMARY OF THE INVENTION

The present invention is an impedance-matched write circuit that selectively provides a write current through a write head in first and second opposite directions. The write circuit is connected to the write head by an interconnect, and has a positive supply level and a negative supply level. A first voltage source provides a first control voltage, and a second voltage source provides a second control voltage. A first resistor is provided between the first voltage source and the interconnect for impedance matching to the interconnect, and a second resistor is provided between the second voltage source and the interconnect for impedance matching to the interconnect. The first and second control voltages provide a transient voltage to the interconnect and provide a subsequent steady-state voltage to the interconnect. In one embodiment, first and second current sinks are provided to sink a first current from a first side of the interconnect when a first voltage at the first side of the interconnect is low; and to sink a second current from a second side opposite the first side of the interconnect when a second voltage at the second side of the interconnect is low, thereby increasing the transient voltage delivered to the interconnect.

DETAILED DESCRIPTION

As described above, an interconnect connects the writer circuit to the write head. Typically, the writer circuit is part of the integrated circuit preamplifier chip mounted to the proximal end of the actuator arm(s) on the E-block, and the interconnect cable extends along the actuator arm(s) to the write head(s). Hence, the interconnect cable is a transmission line and has a length of about 2 inches. The impedance of the interconnect cable is spread somewhat evenly along its length. In order to reduce or eliminate pattern dependent distortion in the operation of the writer circuit, the write circuit must be matched to the impedance of the interconnect cable.

Figure 1:
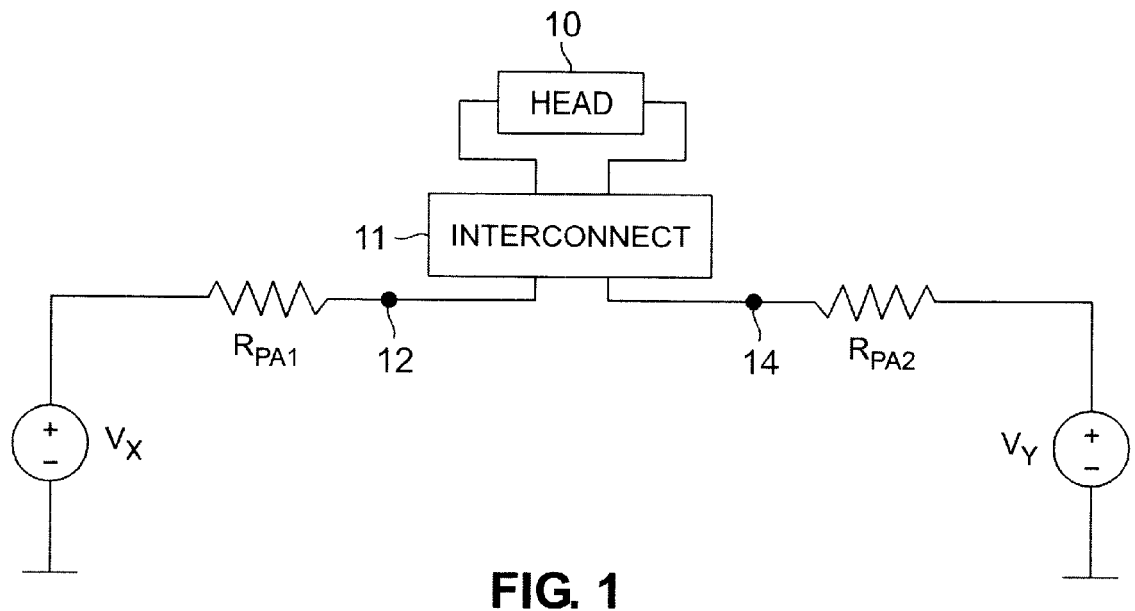
FIG. 1 is a simplified schematic diagram of an impedance-matched write circuit according to a first embodiment of the present invention.

FIG. 1 is a simplified schematic diagram of an impedance-matched write circuit according to a first embodiment of the present invention. The writer circuit includes ideal voltage sources $V_X$ and $V_Y$ connected through series resistors $R_{PA1}$ and $R_{PA2}$ to pins 12 and 14 on opposite sides of interconnect 11 for connection to head 10. Resistors $R_{PA1}$ and $R_{PA2}$ are selected for impedance matching to interconnect 11, with each of those resistors having a value equal to half of the characteristic impedance of interconnect 11.

In U.S. application Ser. No. 09/152,869 filed Sep. 14, 1998 for "Advanced Writer Using Impedance Matching and Voltage-Mode Writing Techniques" by John D. Leighton and Eric Groen and assigned to the same assignee as the present invention, an impedance matched write driver circuit is described in which a voltage-mode writer is arranged in parallel with an impedance-matched writer to ensure that the maximum available voltage is delivered to the head pins. Because an impedance-matched writer alone is not capable of delivering the maximum available voltage to the interconnect, rise-time performance is sub-optimal. The present invention operates on a Thévenin principle in which the transient voltage ($V_{TL}$) delivered by the writer to the interconnect is represented by:

$$V_{TL} = V_{AVAIL} \frac{Z_{TL}}{2R_{PA} + Z_{TL}} + I_W \left( \frac{Z_{TL}(2R_{PA} + R_S)}{2R_{PA} + Z_{TL}} - R_S \right) \quad (1)$$

where $R_{PA}$ is the impedance of the preamplifier series resistors, $Z_{TL}$ is the interconnect impedance, $R_S$ is the resistance associated with the head (which is typically quite small), $I_W$ is the write current and $V_{AVAIL}$ is the voltage swing between the positive and negative rails of the circuit minus some voltage determined by head room constraints. Where the resistance of the Thévenin writer is set to properly match the impedance of the interconnect, i.e., $$R_{PA} = \frac{Z_{TL}}{2}, \quad (2)$$

then $$V_{TL} = \frac{V_{AVAIL}}{2} + I_W \left( R_{PA} - \frac{R_S}{2} \right) \quad (3)$$

For typical component values, $V_{TL}$ is approximately equal to two-thirds of $V_{AVAIL}$. Therefore the performance penalty of not using additional boosting circuitry, such as the parallel voltage-mode writer described in the aforementioned application Ser. No. 09/152,869, is modest. If the preamplifier resistances are each set to less than half of the interconnect's differential impedance, even more voltage would be delivered to the interconnect, but the interconnect would not be brought exactly to steady-state due to improper impedance matching.

Figure 2:
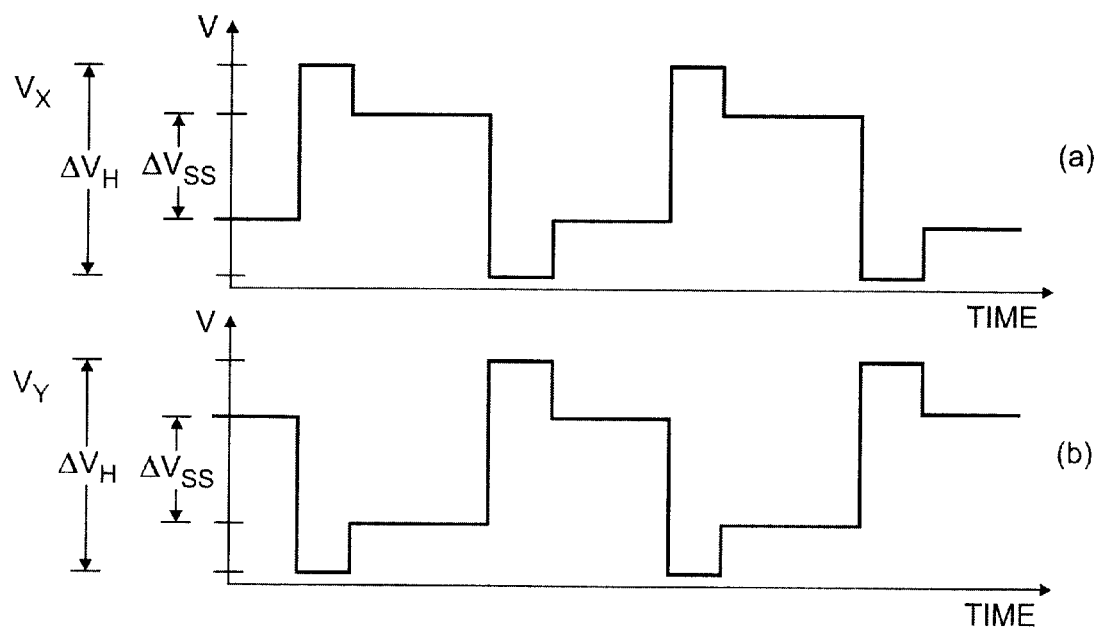
FIG. 2 is a stacked chart illustrating control waveforms utilized in the impedance-matched write circuit shown in FIG. 1.

FIG. 2 is a stacked chart illustrating control waveforms utilized in the impedance-matched write circuit shown in FIG. 1. Each pulse of control signals $V_X$ and $V_Y$ may be expressed as a transition portion and a steady state portion. The transition portion of the pulse generates an excursion ($\Delta V_H$) limited by the supply voltage and the head room constraints on the circuit. The steady state voltage difference ($\Delta V_{SS}$) sets the steady state write current as follows:

$$I_W = \frac{\Delta V_{SS}}{R_S + 2R_{PA}} \quad (4)$$

Figure 3:
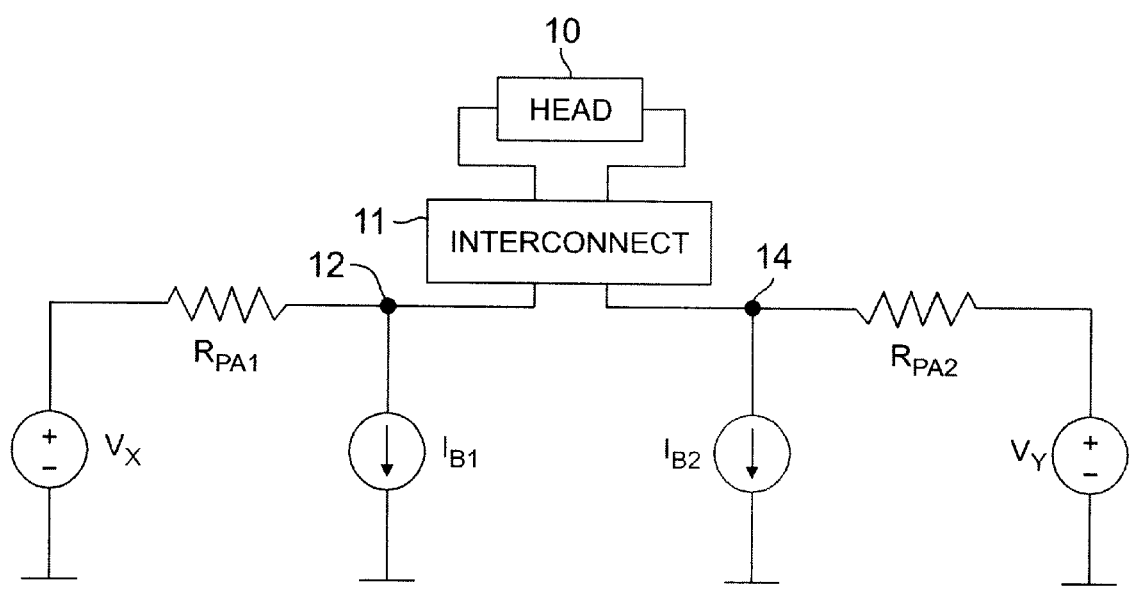
FIG. 3 is a simplified schematic diagram of an impedance-matched write circuit with current boost according to a second embodiment of the present invention.
Figure 4:
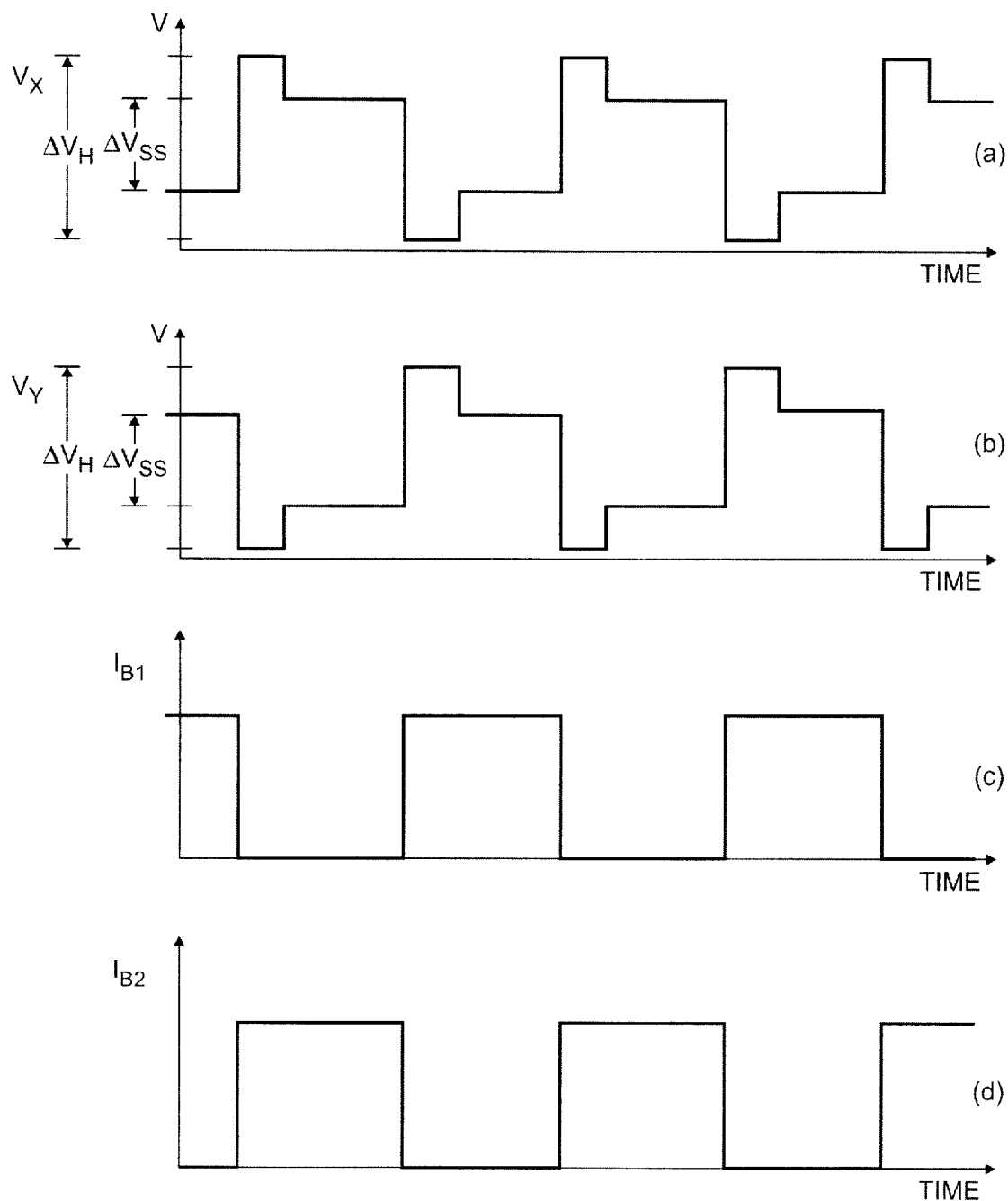
FIG. 4 is a stacked chart illustrating control waveforms utilized in the impedance-matched write circuit with current boost shown in FIG. 3.

FIG. 3 is a simplified schematic diagram of an impedance-matched write circuit with current boost according to a second embodiment of the present invention. The second embodiment is similar to the first embodiment, except that switched current sources $I_{B1}$ and $I_{B2}$ are connected to respective pins 12 and 14 to achieve a slight improvement in the voltage that can be delivered to interconnect 11. FIG. 4 is a stacked chart illustrating control waveforms utilized in the impedance-matched write circuit with current boost shown in FIG. 3. Current sources $I_{B1}$ and $I_{B2}$ are activated to pull down on the pin that is driven low during the transient (the negative interconnect pin), resulting in increased voltage ($\Delta V_H$) delivered to interconnect 11. The maximum current that can be pulled from the interconnect pin is equal to the transient current into the head. The resulting voltage that is then applied to the interconnect is given by:

$$V_{TL} = V_{AVAIL} \frac{Z_{TL}}{R_{PA} + Z_{TL}} + I_W \frac{R_{PA}(Z_{TL} - R_S)}{R_{PA} + Z_{TL}} \quad (5)$$

If the preamplifier writer resistance is sized to properly match the differential impedance of the interconnect, the voltage supplied to the interconnect by the preamplifier is given by:

$$V_{TL} = \frac{2}{3} V_{AVAIL} + I_W \frac{Z_{TL} - R_S}{3} \quad (6)$$

In this case, the voltage applied to the interconnect is more than for the simple Thévenin writer illustrated in FIG. 1. Using typical parameter values known in the art in equation 9 results in an applied voltage that is 80% of the maximum voltage available. This can be improved to 100% using boost circuitry in a complementary fashion to add current to the positive voltage interconnect pin, as is briefly described below with respect to FIGS. 9 and 10.

Figure 5:
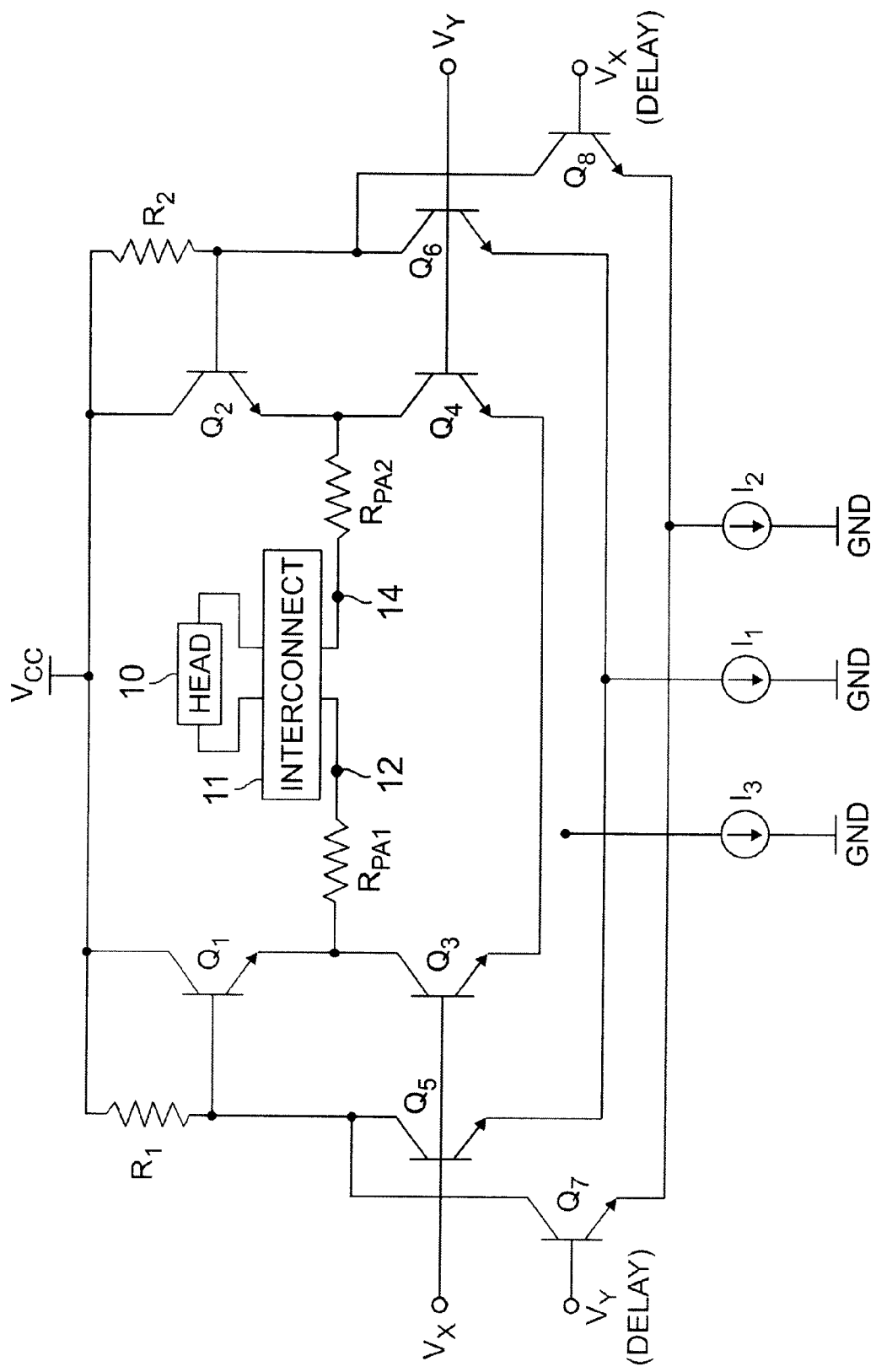
FIG. 5 is a schematic diagram of a circuit for realizing the impedance-matched write circuit of the first embodiment of the invention with NPN transistors only.

FIG. 5 is a schematic diagram of a circuit for realizing the impedance-matched write circuit of the first embodiment of the invention with NPN transistors only. As shown in FIG. 5, the complex control waveforms for $V_X$ and $V_Y$ are actually generated by simple high and low logic signals for $V_X$ and $V_Y$ and delayed versions of those same high and low logic signals, $V_X$(delay) and $V_Y$(delay). These delayed signals can be generated by fixed or programmable delay circuitry.

As shown in FIG. 5, transistor Q1 has a collector connected to the positive supply voltage (e.g., $V_{CC}$), and transistor Q2 also has a collector connected to the positive supply voltage. Preamplifier resistor $R_{PA1}$ is connected between the emitter of transistor Q1 and interconnect pin 12 and preamplifier resistor $R_{PA2}$ is connected between the emitter of transistor Q2 and interconnect pin 14. Resistor R1 is connected between the positive supply voltage and the base of transistor Q1, and resistor R2 is connected between the positive supply voltage and the base of transistor Q2. Transistor Q3 has a collector connected to the emitter of transistor Q1, and has a base connected to control signal $V_X$. Transistor Q4 has a collector connected to the emitter of transistor Q2, and has a base connected to control signal $V_Y$. The emitters of transistors Q3 and Q4 are connected together, and then are connected through current source I3 to a negative voltage level (e.g., ground). Transistor Q5 has a collector connected to the base of transistor Q1, and has a base connected to control signal $V_X$. Transistor Q6 has a collector connected to the base of transistor Q2, and has a base connected to control signal $V_Y$. The emitters of transistors Q5 and Q6 are connected together, and then are connected through current source I1 to the negative voltage level. Transistor Q7 has a collector connected to the base of transistor Q1, and has a base connected to control signal $V_Y$(delay). Transistor Q8 has a collector connected to the base of transistor Q2, and has abase connected to control signal $V_X$(delay). The emitters of transistors Q7 and Q8 are connected together, and then are connected through current source I2 to the negative voltage level.

The circuit shown in FIG. 5 is operated to produce the waveform shown in FIG. 2, with a transient signal portion and a steady state signal portion of each control signal pulse. The levels of these portions of the control signal pulse are controlled by the selected values of current sources I1 and I2 and the values of resistors R1 and R2 (which are equal to each other). For a transition, such as when $V_X$ switches from low to high and $V_Y$ switches from high to low, transistors Q3 and Q5 are turned on and transistors Q4 and Q6 are turned off. Transistor Q7 remains on until the delay period is over, and transistor Q8 likewise remains off until the delay period is over. Therefore, during an initial transition period, transistor Q3 conducts a current controlled by I3, transistor Q5 conducts a current controlled by I1, and transistor Q7 conducts a current controlled by I2. The current pulled through resistor R1 is therefore controlled by the sum of I1 and I2, and the voltage at the base of transistor Q1 drops to a low value, turning emitter-follower transistor Q1 off and causing the voltage at the emitter of transistor Q1 to drop to a low value as well. Meanwhile, since no current is pulled through resistor R2, there is a high voltage at the base of transistor Q2, such that transistor Q2 is turned on and the voltage at the emitter of transistor Q2 is a high value. The resulting voltage across resistors $R_{PA1}$ and RpA2, interconnect 11 and head 10 causes a current pulse to flow through head 10, with transistor Q3 acting as a current sink and I3 being selected to have a value greater than or equal to the write current value to ensure proper operation of the emitter-follower circuits (transistors Q1, Q2, Q3 and Q4).

After the expiration of the delay period, $V_X$(delay) switches high and $V_Y$(delay) switches low, such that transistor Q8 turns on and transistor Q7 turns off. This is the steady state condition of the write circuit, both transistors Q1 and Q2 are turned on, and as a result there is a lesser voltage delivered to interconnect 11. The steady state write current is set by the following component values:

$$I_W = \frac{(I_2 - I_1)R_1}{2R_{PA} + R_S} \qquad (7)$$

The circuit operates in the opposite manner for an opposite transition of control signals $V_X$ and $V_Y$.

Figure 6:
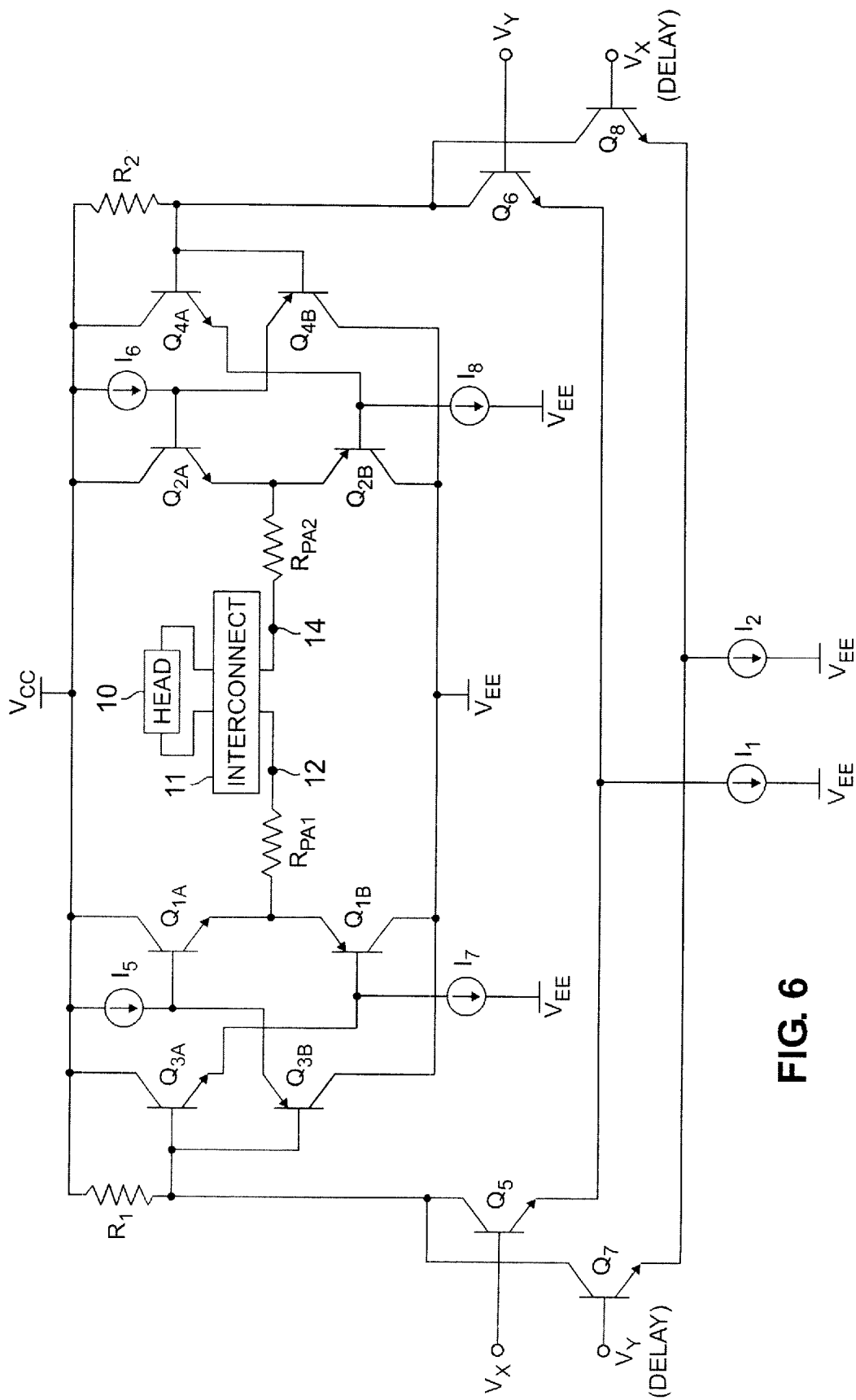
FIG. 6 is a schematic diagram of a circuit for realizing the impedance-matched write circuit of the first embodiment of the invention with complementary NPN and PNP transistors.

FIG. 6 is a schematic diagram of a circuit for realizing the impedance-matched write circuit of the first embodiment of the invention with complementary NPN and PNP transistors. Here high speed PNP transistors Q1B, Q2B, Q3B and Q4B are used with complementary NPN transistors Q1A, Q2A, Q3A and Q4A, along with current sources I5, I6, I7 and I8 to form class AB drivers to replace the emitter-follower circuits of FIG. 5. This circuit implementation has the benefit of lower power as smaller predriver current is required, and the I3 current source of FIG. 5 can be eliminated. The circuit shown in FIG. 6 operates in a manner similar to the circuit shown in FIG. 5 in all other essential respects.

Figure 7:
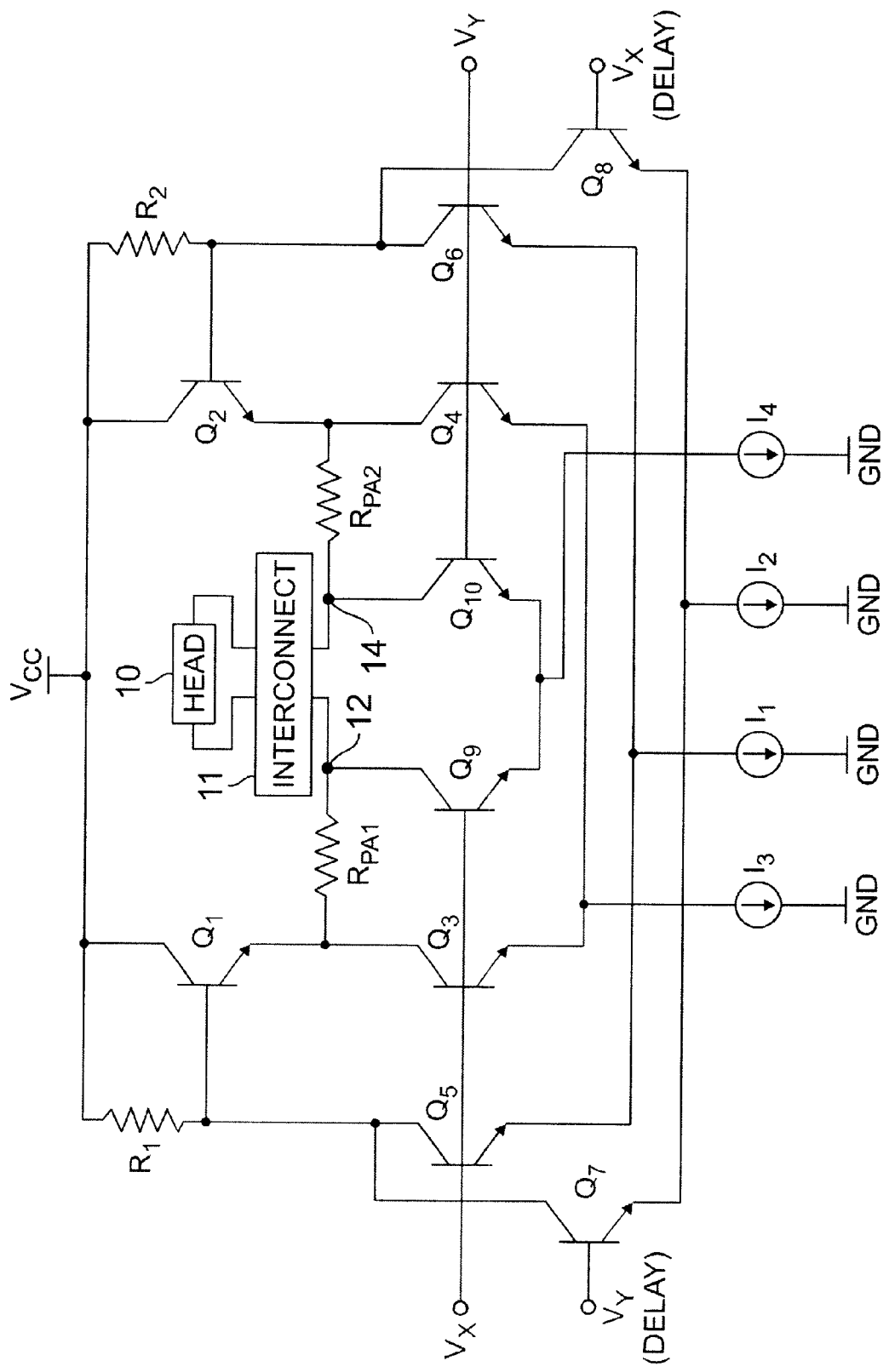
FIG. 7 is a schematic diagram of a circuit for realizing the impedance-matched write circuit with current boost of the second embodiment of the invention with NPN transistors only.

FIG. 7 is a schematic diagram of a circuit for realizing the impedance-matched write circuit with current boost of the second embodiment of the invention with NPN transistors only. Again, the complex control waveforms for $V_X$ and $V_Y$ are actually generated by simple high and low logic signals for $V_X$ and $V_Y$ and delayed versions of those same high and low logic signals, $V_X$(delay) and $V_Y$(delay). The delayed signals can be generated by fixed or programmable delay circuitry.

As shown in FIG. 7, and similar to the first embodiment shown in FIG. 5, transistor Q1 has a collector connected to the positive supply voltage (e.g., $V_{CC}$), and transistor Q2 also has a collector connected to the positive supply voltage. Preamplifier resistor $R_{PA1}$ is connected between the emitter of transistor Q1 and interconnect pin 12 and preamplifier resistor $R_{PA2}$ is connected between the emitter of transistor Q2 and interconnect pin 14. Resistor R1 is connected between the positive supply voltage and the base of transistor Q1, and resistor R2 is connected between the positive supply voltage and the base of transistor Q2. Transistor Q3 has a collector connected to the emitter of transistor Q1, and has a base connected to control signal $V_X$. Transistor Q4 has a collector connected to the emitter of transistor Q2, and has a base connected to control signal $V_Y$. The emitters of transistors Q3 and Q4 are connected together, and then are connected through current source I3 to a negative voltage level (e.g., ground). Transistor Q5 has a collector connected to the base of transistor Q1, and has abase connected to control signal $V_X$. Transistor Q6 has a collector connected to the base of transistor Q2, and has a base connected to control signal $V_Y$. The emitters of transistors Q5 and Q6 are connected together, and then are connected through current source I1 to the negative voltage level. Transistor Q7 has a collector connected to the base of transistor Q1, and has a base connected to control signal $V_Y$(delay). Transistor Q8 has a collector connected to the base of transistor Q2, and has a base connected to control signal $V_X$(delay). The emitters of transistors Q7 and Q8 are connected together, and then are connected through current source I2 to the negative voltage level.

In order to implement the current boost of the second embodiment of the invention, transistor Q9 is provided with a collector connected to interconnect pin 12, and with a base connected to control signal $V_X$. Transistor Q10 is provided with a collector connected to interconnect pin 14, and with a base connected to control signal $V_Y$. The emitters of transistors Q9 and Q10 are connected together, and then are connected through current source I4 to the negative voltage level.

The operation of the circuit shown in FIG. 7 is nearly identical to that of the circuit shown in FIG. 5, with the exception of the added boost circuitry employed in the circuit of FIG. 7. Upon the occurrence of a transition, such as $V_X$ switching from low to high and $V_Y$ switching from high to low, transistor Q9 is turned on and transistor Q1 is turned off. Therefore, the transient write current $I_W$ through head 10 is governed by the following equation:

$$(I1+I2)R1 = I_W(R_{TL}-R_S) + I4(R_{TL}+R_{PA}) \qquad (8)$$

Transistor Q9 remains on and transistor Q10 remains off during the steady state portion of the waveform as well, with the steady state write current $I_W$ through head being governed by the following equation:

$$(I2-I1)R1 = I_W(2R_{PA}+R_S) - I4R_{PA} \qquad (9)$$

There is one additional condition imposed by the addition of the boost circuitry of FIG. 7, which is a limit on the current that can be delivered to interconnect 11 before saturating the Q9–Q10 differential pair transistors. This condition is represented by the following equation:

$$I4(R_{TL}+R_{PA}) = V_{AVAIL} - I_W(R_{TL}-R_S) \qquad (10)$$

Given these three conditions with the three unknown currents (I1, I2 and I4, since I3 needs only to be greater than the write current through head 10 minus the value of boost current I4), proper values of current sources I1, I2 and I4 may be chosen.

As a result of the current boost circuitry shown in the circuit of FIG. 7, current is pulled from the low interconnect pin immediately following a transition in the control signals. This causes the voltage at the interconnect pin to drop even lower than it would without the boost circuitry, which results in a larger voltage delivered to interconnect 11 and thus reduces the time required for the write current to switch directions through head 10 upon the occurrence of a transition.

Figure 8:
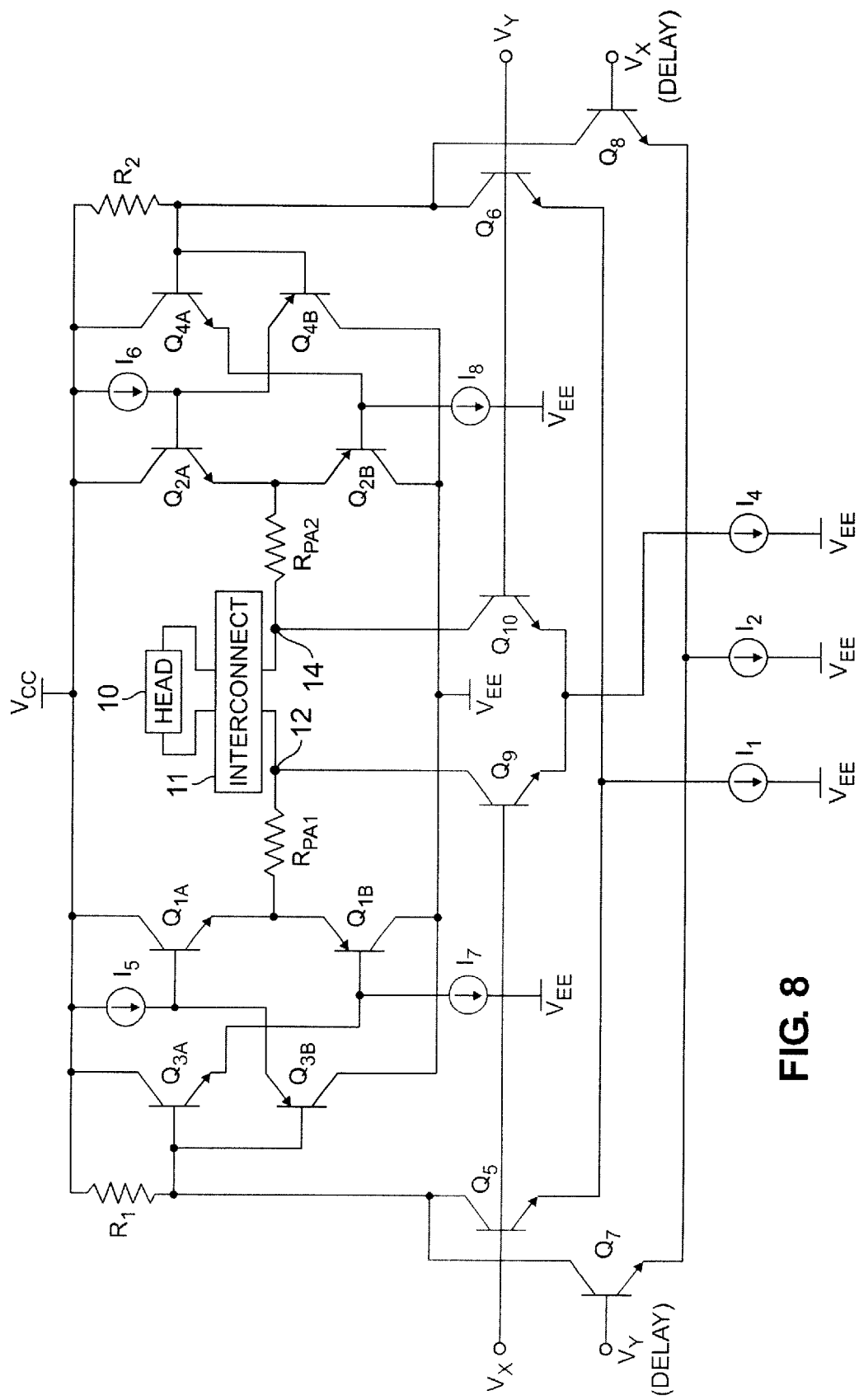
FIG. 8 is a schematic diagram of a circuit for realizing the impedance-matched write circuit with current boost of the second embodiment of the invention with complementary NPN and PNP transistors.

FIG. 8 is a schematic diagram of a circuit for realizing the impedance-matched write circuit with current boost of the second embodiment of the invention with complementary NPN and PNP transistors. Again, high speed PNP transistors Q1B, Q2B, Q3B and Q4B are used with complementary NPN transistors Q1A, Q2A, Q3A and Q4A, along with current sources I5, I6, I7 and I8 to form class AB drivers to replace the emitter-follower circuits of FIG. 7. This circuit implementation has the benefit of lower power as smaller predriver current is required, and the I3 current source of FIG. 7 can be eliminated. The circuit shown in FIG. 8 operates in a manner similar to the circuit shown in FIG. 7 in all other essential respects.

Figure 9:
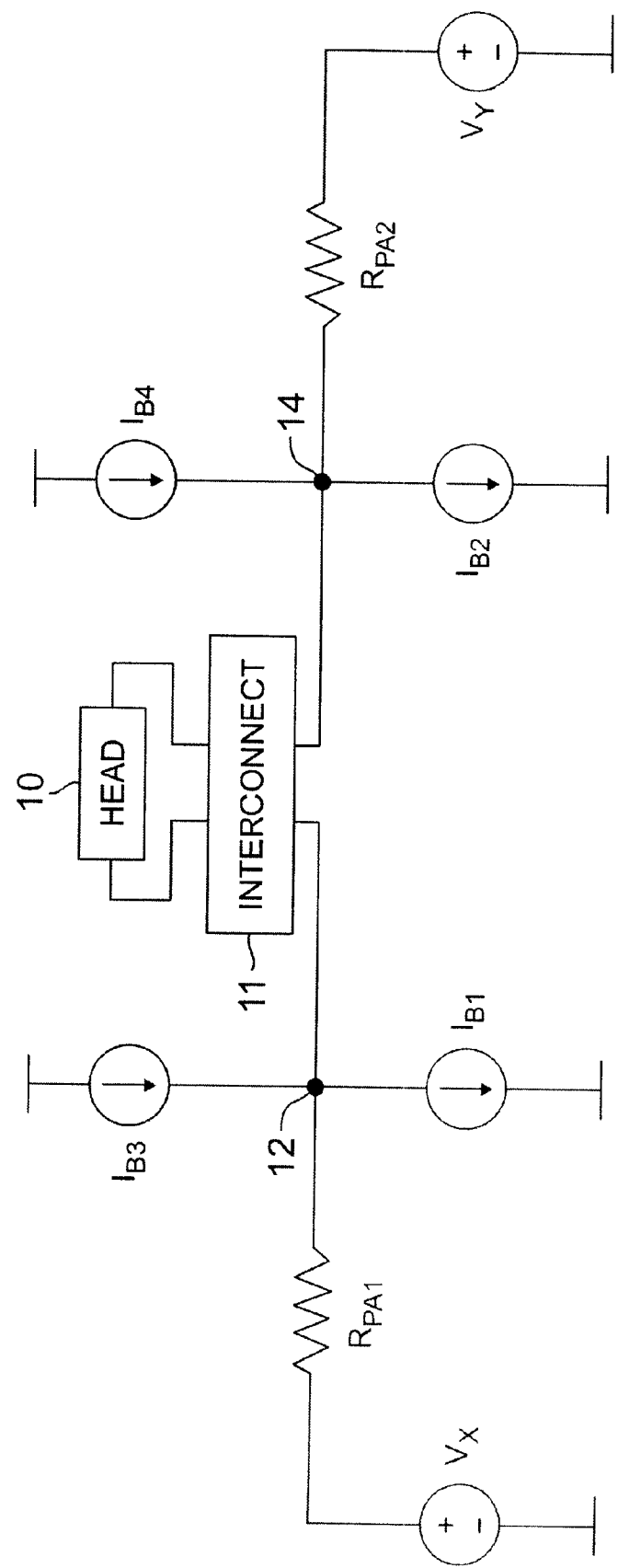
FIG. 9 is a schematic diagram of an impedance-matched write circuit with dual current boost according to a third embodiment of the present invention.
Figure 10:
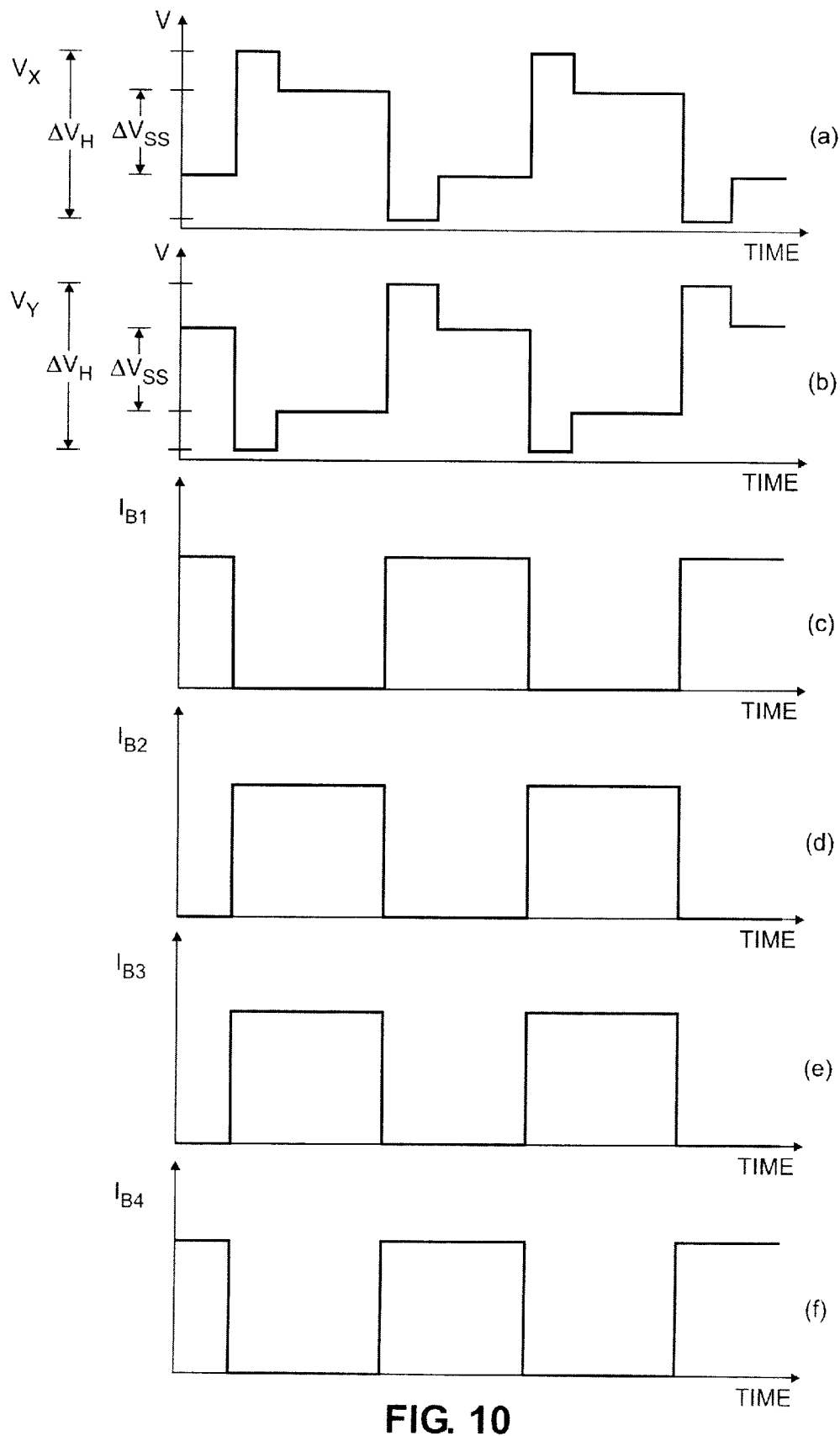
FIG. 10 is a stacked chart illustrating control waveforms utilized in the impedance-matched write circuit with dual current boost shown in FIG. 9.

FIG. 9 is a schematic diagram of an impedance-matched write circuit with dual current boost according to a third embodiment of the present invention. The third embodiment is nearly identical to the second embodiment of the invention, except that switched boost current sources $I_{B3}$ and $I_{B4}$ are connected to respective interconnect pins 12 and 14 to pull up the voltage at the high interconnect pin following a control voltage transition, thus further increasing the transient voltage applied to interconnect 11. FIG. 10 is a stacked chart illustrating the control waveforms utilized in the impedance matched write circuit with dual current boost shown in FIG. 9. The chart shows the complementary operation of switched boost current sources $I_{B1}$, $I_{B2}$, $I_{B3}$ and $I_{B4}$ to increase the voltage applied to interconnect 11, which enables the transient voltage ($\Delta V_H$) applied to reach approximately 100% of the maximum voltage available for delivery to interconnect 11. The detailed circuit implementation of the third embodiment is similar to the circuits shown in FIGS. 7 and 8 with respect to the second embodiment, with the addition of an additional differential pair of transistors and an additional current source to realize the additional pull-up boost current, and the design of such a circuit implementation is within the expertise of one skilled in the art in conjunction with the circuits already shown in FIGS. 7 and 8.

The impedance matched write circuits of the present invention operate on a substantially different principle than prior current-switching write circuits, which allows the circuits to be impedance matched to the interconnect and thereby results in reduced or eliminated pattern dependent distortion from operation of the circuit. The invention is predicated on the discovery that, with the proper arrangement of circuit components and the proper values chosen for those components, a sufficient transient voltage can in fact be delivered to the interconnect so that write current transitions may be achieved with a sufficiently low rise time for high performance applications. This discovery enables an impedance matched configuration of the write circuit to be employed, with the associated reduction of pattern dependent distortion, while providing excellent performance and low rise times as required by many high performance applications.

Although the present invention has been described with reference to preferred embodiments, workers skilled in the art will recognize that changes may be made in form and detail without departing from the spirit and scope of the invention. Particularly, while the invention is described in the form of discrete devices, it is recognized that the circuit is preferably reduced to practice in the form of an integrated circuit (IC). Therefore, terms such as "device" and the like should be construed in their broadest contexts to include portions of ICs that are conveniently described as functional components, as well as discrete devices.

What is claimed is:

1. A write circuit for selectively providing a write current through a write head in first and second opposite directions, the write circuit being connected to the write head by an interconnect and having a positive voltage supply level and a negative voltage supply level, the write circuit comprising:

first means for providing a first control voltage;

second means for providing a second control voltage;

a first resistor between the first means and the interconnect for impedance matching to the interconnect;

a second resistor between the second means and the interconnect for impedance matching to the interconnect; and wherein the first and second control voltages provide a transient voltage to the interconnect and provide a subsequent steady-state voltage to the interconnect.

2. The write circuit of claim 1, wherein the interconnect has a characteristic impedance, the first resistor has an impedance equal to half of the characteristic impedance of the interconnect and the second resistor has an impedance equal to half of the characteristic impedance of the interconnect.

3. The write circuit of claim 1, wherein the steady-state voltage provided to the interconnect is less than the transient voltage provided to the interconnect.

4. The write circuit of claim 1, wherein the transient voltage provided to the interconnect is no less than about two-thirds of an available voltage determined by a difference between the positive and negative voltage supply levels minus a voltage determined by head room constraints.

5. The write circuit of claim 1, further comprising:

means for sinking a first current from a first side of the interconnect when a first voltage at the first side of the interconnect is low; and means for sinking a second current from a second side opposite the first side of the interconnect when a second voltage at the second side of the interconnect is low.

6. The write circuit of claim 5, further comprising:

means for providing a third current to the first side of the interconnect when the first voltage at the first side of the interconnect is high; and means for providing a fourth current to the second side of the interconnect when the second voltage at the second side of the interconnect is high.

* * * * *